Sept. 11, 1956

W. F. NEWBOLD

2,762,938

ELECTRICAL CONTROL APPARATUS

Filed Nov. 10, 1953

INVENTOR.
WILLIAM F. NEWBOLD
BY Arthur H. Swanson
ATTORNEY.

Sept. 11, 1956 W. F. NEWBOLD 2,762,938
ELECTRICAL CONTROL APPARATUS
Filed Nov. 10, 1953 6 Sheets-Sheet 5

INVENTOR.
WILLIAM F. NEWBOLD
BY Arthur H. Swanson
ATTORNEY.

Sept. 11, 1956     W. F. NEWBOLD     2,762,938

ELECTRICAL CONTROL APPARATUS

Filed Nov. 10, 1953     6 Sheets-Sheet 6

*INVENTOR.*
WILLIAM F. NEWBOLD
BY
*Arthur H. Swanson*
ATTORNEY.

United States Patent Office 2,762,938
Patented Sept. 11, 1956

2,762,938

ELECTRICAL CONTROL APPARATUS

William F. Newbold, Philadelphia, Pa., assignor to Minneapolis-Honeywell Regulator Company, Minneapolis, Minn., a corporation of Delaware Application November 10, 1953, Serial No. 391,207

15 Claims. (Cl. 307—116)

The general object of the present invention is to provide a new and improved electrical control apparatus which may be used for maintaining constant the magnitude of a controlled variable. More particularly, the invention is concerned with a new and improved control apparatus which is characterized by its adaptability to automatic as well as manual operation with the apparatus arranged so that the entire apparatus may be switched from a manual mode of operation to an automatic mode, or automatic to manual, without any perceptible change in output of the control apparatus or any change in the controlled variable.

A universal type of automatic control apparatus for maintaining constant a control variable has many requirements. One requirement is that the apparatus be adapted for use where the components of the apparatus may be positioned a considerable distance apart without the overall operation of the apparatus being affected. It has been found that this may be attained if the control signals used throughout the apparatus are direct current so that the components of the apparatus will not respond to stray electrical fields of the alternating current type.

Another requirement for a universal type of controller is that the apparatus be arranged to incorporate automatic reset components which are effective to maintain the magnitude of a controlled variable at an exact value regardless of the loading or other factors which tend to cause the condition of the variable to droop or lag behind the desired value. Thus, in the controlling of the temperature of a furnace, changes in the B. t. u. content of the fuel supplied to the furnace, or the size of the load of the furnace, may cause the temperature of the furnace to lag or droop from a desired value. The present control with its reset components included will recognize this lag or droop and produce an output controlling action which will eliminate the deviation.

A further requirement of the apparatus of the present type is that it be readily adapted for servicing of the components and for this it is necessary that the apparatus be manually operable without loss of control of the controlled variable. When automatic reset is included it is essential the apparatus be readily switched from manual to automatic, as well as automatic to manual, without introducing any appreciable change in the output which would upset the variable being controlled. This requires that the reset apparatus, which is effective when on the automatic mode of control, be kept in step with the manual control.

It is therefore a more specific object of the present invention to provide a new and improved control apparatus incorporating automatic reset where the control apparatus is readily adapted for switching between a manual mode of operation and the automatic mode of operation with means provided for maintaining the reset in step with the manual mode of operation.

Another more specific object of the present invention is to provide a new and improved control apparatus incorporating an electrical reset which may be operated in a manual or an automatic position without any perceptible change in the output of the control apparatus when the apparatus is switched between the manual and automatic positions.

Still another more specific object of the present invention is to provide an electrical control apparatus which includes a controller having an output circuit and an input circuit with automatic reset provided by a feedback from said output to said input, with the controller adapted for manual or automatic operation and with the reset of the controller being maintained in step while in the manual operating condition.

A further more specific object of the present invention is to provide a new and improved control apparatus incorporating an electrical controller having an input and an output and a reset circuit included in a feedback circuit and said output to said input wherein the reset is maintained in step with a manual mode of operation by an electrical signal which is produced in the output of the controller when the control apparatus is being manually operated.

The various features of novelty which characterize the invention are pointed out with particularly in the claims annexed to and forming a part of the specification. For a better understanding of the invention, its advantages, and specific objects attained with its use, reference should be had to the accompanying drawings and descriptive matter in which there has been illustrated and described preferred embodiments of the invention.

Figure 1:
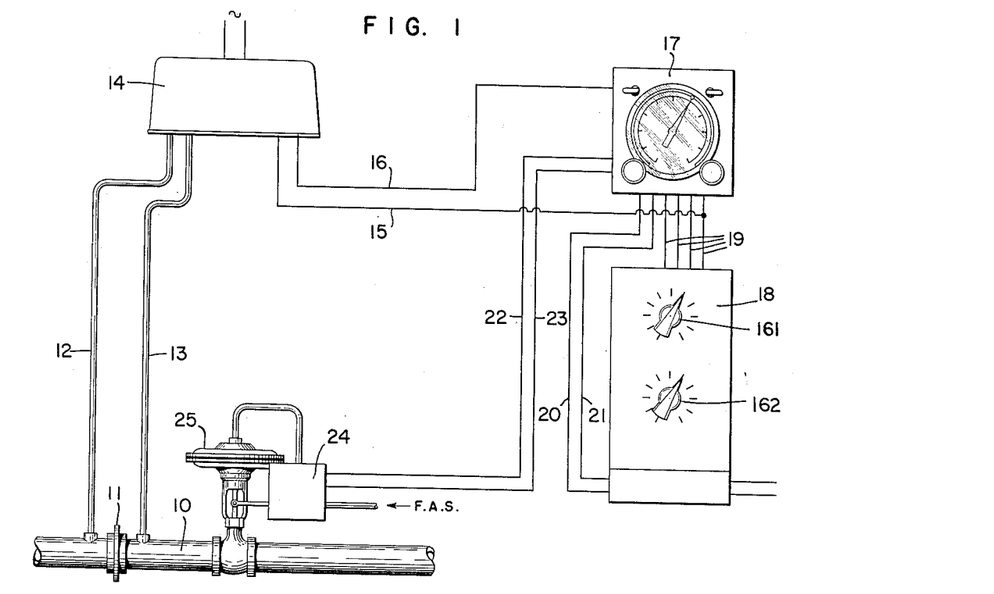
Fig. 1 shows a representative contracted process including control apparatus of the present type.

Figure 1

Referring first to Fig. 1, the numeral 10 represents a conduit through which is flowing a fluid. As represented in Fig. 1, the control apparatus is adapted to regulate the flow of this fluid and maintain the flow constant at a desired value. For sensing the flow in the conduit 10 an orifice plate 11 may be provided and a pair of pressure takeoffs 12 and 13. These in turn may be applied to a differential pressure converter type of instrument 14. This instrument is effective to transform the differential pressure in the conduits 12 and 13 into a proportional electrical current on electrical leads 15 and 16. The output electrical current from the leads 15 and 16 is applied to the input of an indicator and switching panel 17 where the signal is compared with a manually determined set point signal and applied to the input of the electrical controller 18 by the electrical leads 19.

The output of the electrical controller is applied by way of leads 20 and 21 back to the indicating and switching panel 17 and thence to output leads 22 and 23 which lead to an electric to pneumatic valve positioner 24. The valve positioner is arranged to control the operation of a pneumatic valve 25 which in turn is used to regulate the flow of fluid in the conduit 10.

Basically, the operation of this apparatus shown in Fig. 1 is that the rate of flow of the fluid is determined by the differential pressure in the lines 12 and 13 with the differential pressure converted to a proportional electrical signal in the output of the instrument 14. This output signal is applied to the switching and indicating panel 17 to be compared with a set point signal. If there is a difference between the set point signal and the transmitted signal from the instrument 14, the controller 18 will have an input and will produce an appropriate output control action which will be applied by way of the leads 20 and 21, and 22 and 23 to the electric to pneumatic valve positioner 24. The valve positioner 24 will in turn position the valve 25 so as to maintain the desired flow of the fluid in the conduit 10.

As will be hereinafter explained, the controller 18 incorporates both proportional and resist action. Further, while the apparatus is shown to control flow, it will be obvious that it can be used to control the magnitude of any variable, such as liquid level, temperature, or the like.

Figure 2:
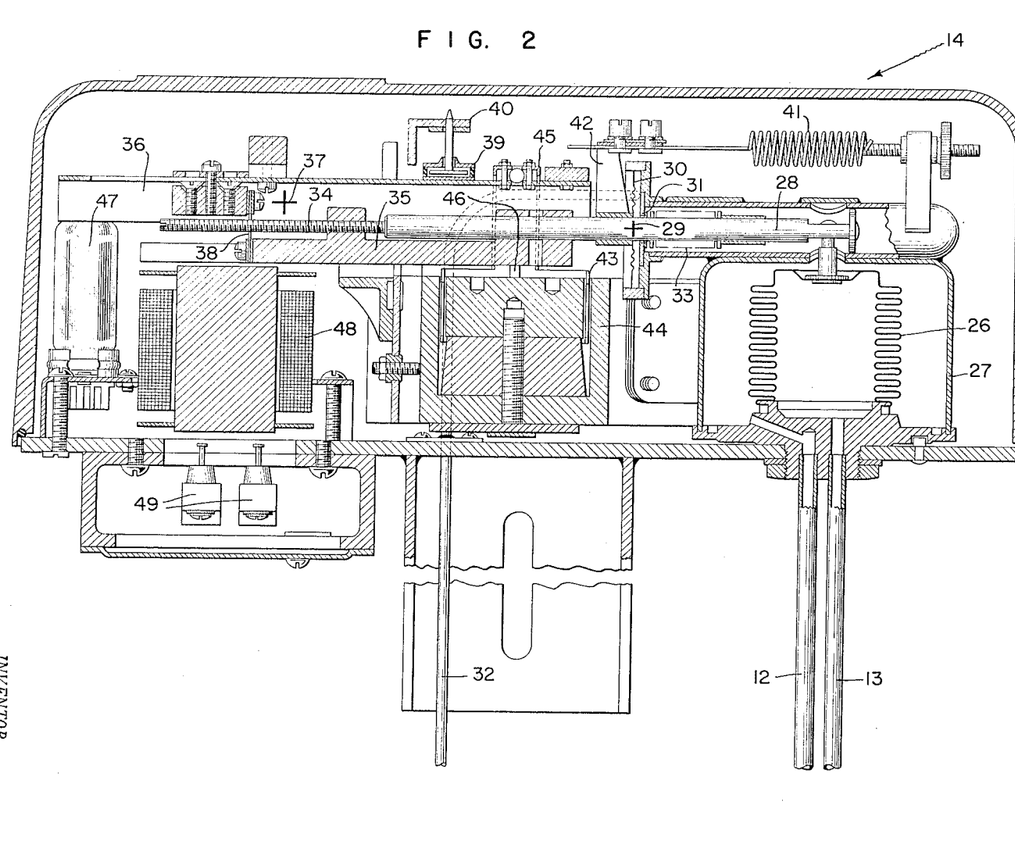
Fig. 2 shows a mechanical embodiment of a transmitter which may be used in control apparatus of the present type.

*Figure 2*

A preferred embodiment of the mechanical features of the transmitter 14 is shown in Fig. 2. This apparatus comprises an input differential pressure bellows 26 which is mounted within a sealed enclosure 27. The differential pressure is supplied to the inner portion of the bellows by the input conduit 13 and the outer portion of the bellows by the conduit 12. Attached to the top of the bellows is a pivoted beam 28, said beam being pivoted at 29. The beam 29 is arranged to pass the motion of the bellows 26 to an apparatus external of the housing 27. The beam 28 passes through a sealing diaphragm 30 which provides a pressure seal to prevent the pressure within the housing 27 from passing out of the system. A further seal 31 is provided between the diaphragm 30 and the enclosure 27 and a fluid under pressure may be supplied to the space between the diaphragm 30 and the seal 31 by an input conduit 32. This latter arrangement may be desirable when it is necessary to prevent highly reactive fluids within the chamber 27 from entering into the other portion of the apparatus. Thus, the fluid within the conduit 32 is generally under a pressure which is higher than the pressure of the particular process under control. A tension spring 33 tends to force the beam 28 toward the left while the adjustable screw 34 is arranged to bear against the left end of the beam 28 to effectively center the pivot 29 with respect to the diaphragm 30. Carried by the beam 28 is a further section 35 which will follow the motion of the beam 28. Mounted above the beam 28 is a further beam 36. This beam is pivoted at 37 and the motion of the beam 28 is transmitted thereto by a flat metallic ribbon connector 38. Mounted on the beam 36 is a motion detector 39 in the form of a condenser having a pair of condenser plates with a movable plate arranged for perpendicular movement between the fixed plates. The two fixed plates are carried by the beam 36 and the center plate is adapted to be fixedly mounted to a frame member 40 which is fastened to the base of the housing, by means not shown. The structural details of this condenser detector may take the form of the apparatus disclosed in the Robert J. Wagner application, entitled Measuring Apparatus, Serial No. 382,393, filed September 25, 1953. An adjustable tension spring 41 is provided for aligning the apparatus and this spring acts through a frame member 42 which is fixedly attached to the beam 28 immediately adjacent the pivot point 29.

The apparatus is of the balance type and the force balancing action is produced by an electrical coil 43 which cooperates with a permanent magnet 44. The frame for the coil 43 is formed with upright projections, one projection being connected at 45 where the projection is attached to the beam 36 by the ball type connection 46.

Figure 3:
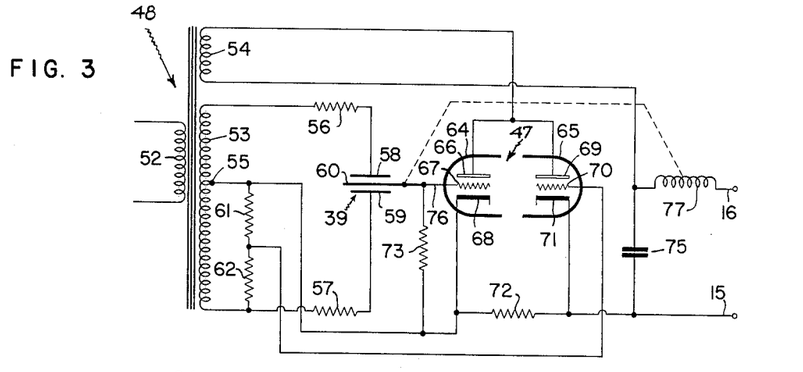
Fig. 3 shows an electrical current transmitting circuit which is associated with the mechanical embodiment of Fig. 2.

Positioned in the housing of the apparatus opposite the end of the bellows 26 and the electrical components of the device and this includes a suitable vacuum tube amplifier 47 and a transformer 48 interconnected in the manner shown in Fig. 3 with other electrical components which are not shown. Electrical terminals are provided at 49 and serve as the output electrical connections for the apparatus.

The mechanical functioning of the apparatus of Fig. 2 will be understood when it is noted that a change in the differential pressure connection on the bellows 26 will deflect the pivoted beam 28. The beam 28 will be effective to deflect the beam 36 by reason of the connection therebetween at 38. The motion of the beam 36 is in turn detected by the condenser detector 39. The condenser detector cooperates with the electrical circuits of the apparatus, shown in Fig. 3, and produces an output electrical current which is applied to the coil 43. The coil 43 will react with the fixed magnet 44 and produce a force balancing action on the beam 36 by way of the connection 46 so as to force balance the input force created by the differential pressure acting on the bellows 26.

*Figure 3*

Fig. 3 shows the electrical means for converting the output motion of the principal beam 28 of the transmitter shown in Fig. 2 into a proportional electrical current. The apparatus shown is a force balance type of apparatus wherein the output current produces a force which tends to balance the force produced on the principal beam by the differential pressure sensing portion of the apparatus of the transmitter.

The electrical transmitter circuit comprises the input alternating current transformer 48 having a primary winding 52 and a pair of secondary windings 53 and 54. The secondary winding 53 is tapped at 55. Connected to the secondary 53 are a pair of resistors 56 and 57 and a pair of fixed condenser plates 58 and 59 of the motion detector 39. A movable plate 60 is arranged to be positioned by the principal beam of the transmitter apparatus. Also connected to the secondary 53 are a pair of voltage divider resistors 61 and 62.

The secondary winding 54 is arranged to supply an energizing voltage to a pair of amplifying devices 64 and 65. The device 64 comprises an anode 66, a control electrode 67, and a cathode 68 while the device 65 comprises an anode 69, a control electrode 70, and a cathode 71. Connected between the cathodes 68 and 71 is a resistor 72 while a resistor 73 is connected to the input of the device 64. The output of the devices 64 and 65 is filtered by a condenser 75 and the output current flows through the coil 77 to leads 15 and 16.

In considering the operation of Fig. 3, it is first assumed that the movable electrode 60 is centered between the fixed plates 58 and 59 so that there is no resultant output electrical signal appearing on the output connection 76 which is connected to the control electrode 67 of the device 64. With no input signal applied to the device 64, the control electrode 67 will be effectively connected to the cathode 68 and the device 64 will act as a diode and will be conducting during the half cycle on which the upper end of the secondary 54 is positive with respect to the lower end. This will mean that a direct current pulsating signal will flow in the circuit which includes the device 64, the secondary 54, and the output leads 15 and 16 with the condenser 75 tending to filter the output current. Further, the device 65 will have a predetermined current flow therethrough which will be established by the voltage derived from the voltage divider including resistors 61 and 62 on the lower half of the secondary 53 as well as the voltage derived from the cathode resistor 72 connected in the output circuit of the device 64. As the device 65 will also be conducting during the same half cycle, this conduction will tend to reinforce the conduction of the device 64. There will thus be flowing through the output leads 15 and 16 a series of direct current pulses whose average amplitude, as filtered by the condenser 75, is indicative of a balance condition as assumed above.

If the movable plate 60 should be displaced upwardly, with the phasing of the winding 53 being the same as that of 54, a positively phased signal will be applied through the lead 76 to the input of the device 64. This positively phased signal will cause an increased conduction by the device 64 and the increase in the conduction of the device 64 will produce an increase in the conduction of the device 65 due to the biasing action of the cathode resistor 62. The net result is an increased current flow in the output circuit of leads 15 and 16. The output force balancing coil 77 will be effective to apply a force to the plate to tend to move the plate back toward its center position.

If the movable plate 60 is moved in a downward direction, the phasing of the signal on the output of lead 76 will be reversed and this reversal will tend to decrease the current flow to the device 64 with a resultant decrease in the current flow to the device 65. The final result is a decreased output on leads 15 and 16. It will thus be seen that the current flow in the output of this apparatus will follow the movement of the movable condenser plate 60.

While a specific arrangement has been shown for this motion detector, it will be obvious that there are many suitable forms which will accomplish the same end result, that is producing an output control current which is proportional to an input motion for force applied to the condenser plate 60.

Figure 4:
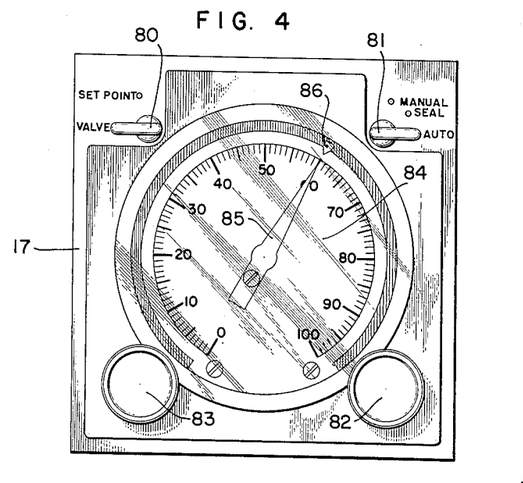
Fig. 4 shows one arrangement of an indicator and switching panel for the present apparatus.

*Figure 4*

The indicating and switching panel 17 comprises a basic panel member upon which are positioned a pair of switching knobs 80 and 81. The switching knob 80 is used to switch the indicator to read either the set point current or valve current, in a manner to be explained below. The switching knob 81 is arranged to manually switch the control apparatus to any one of its three principal modes of operation, that is the automatic mode, the seal mode, and the manual mode. A further knob 82 is arranged to manually adjust the set point of the apparatus, as will also be explained below. Knob 83 may be provided for locking the panel 17 into a fixed position.

The indicator portion of the panel 17 will include a dial 84 carrying appropriate calibrations and an indicator arm 85. A dart 86 is used to indicate the set point which is manually adjusted by the knob 82.

Figure 5:
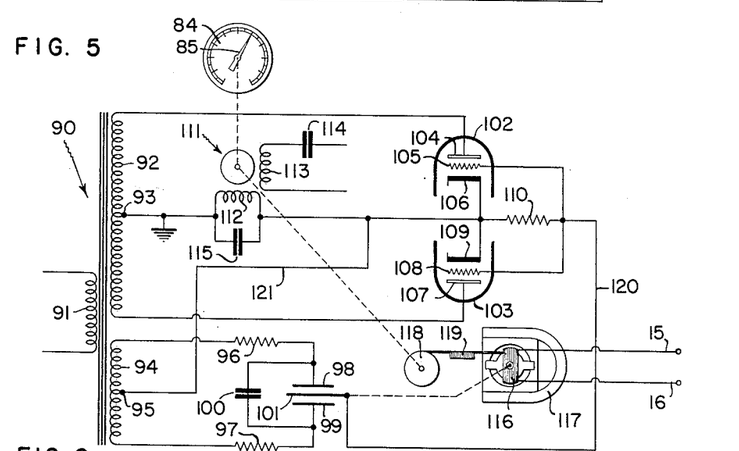
Fig. 5 shows one form of an electrical indicator circuit that may be included in the apparatus.

*Figure 5*

The electrical circuit of Fig. 5 is one form that the electrical circuit for the indicator may assume. This circuit is likewise a force balance circuit wherein a force created by an input signal is balanced by a second force indicative of output motion.

The circuit of Fig. 5 comprises an input transformer 90 having a primary winding 91, a secondary winding 92 tapped at 93 and a secondary winding 94 tapped at 95. Connected to the secondary winding 94 are a pair of resistors 96 and 97 and a pair of fixed condenser plates 98 and 99. Connected across the condenser plates 98 and 99 is a fixed condenser 100. A movable plate 101 is arranged between the two fixed plates 98 and 99.

The secondary section 92 is arranged to supply electrical energy to a pair of amplifying devices 102 and 103. The device 102 has an anode 104, a control electrode 105 and a cathode 106 while the device 103 comprises an anode 107, control electrode 108, and a cathode 109. A resistor 110 is connected between the cathodes and control electrodes of the device 102 and 103. Connected in the output circuit of the device 102 and 103 is a motor 111 having an amplifier winding 112 and a line winding 113, the latter having a condenser 114 in series therewith. A condenser 115 is connected in parallel with the amplifier winding 112. This motor is of conventional type and is adapted to be reversibly operated in accordance with the phasing of the electrical signal applied to the amplifier winding 112.

The input signal to this apparatus is by way of leads 15 and 16 and is applied to a coil 116 which is arranged to cooperate with a permanent magnet 117.

The motor 111 is arranged to drive the indicator needle 85 and also provide, through a gearing arrangement 118 and spring 119, a force balancing feedback action to the coil 116.

In considering the operation of Fig. 5 it is first assumed that the movable plate 101 is centered between the fixed plates 98 and 99. When so centered, the plate 101 will be electrically at the same potential as the point 95 on the secondary 94. The signal on the plate 101 will be transferred by way of lead 120 to the input of devices 102 and 103. The electrical signal from the tap 95 is applied by way of lead 121 to the cathodes of the devices 102 and 103. With no signal on the leads 120 and 121, the devices 102 and 103 will be conducting on alternate half cycles and producing a double frequency pulse in the motor winding 112. This pulse will not be effective to drive the motor 111 and it will remain in a fixed position.

If the current condition in the leads 15 and 16 should change so that the force acting upon the vane 101, as produced by the coil 116, changes, the blade 101 will be moved from its central position. If the blade is moved in an upward direction, there will be an unbalance condition created on the output blade 101 with the phasing of the blade being closer to that of the upper end of the secondary 94. It is assumed that the phasing of the secondaries 92 and 94 are the same so that with the blade 101 moved in an upward direction, during the half cycle when the upper end of the secondary 92 and 94 are positive, the output phasing will be such as to cause the device 102 to conduct more during its conducting half cycle. On the following half cycle, the phasing of both secondaries 92 and 94 will reverse and a more negative signal will be applied to the device 103 with the result that the device 103 will conduct a pulse which is of lesser magnitude than under the above assumed balance condition. The result of this unbalance will be an electrical motor drive signal of the basic frequency which will be effective to drive the motor 111 in a direction to change the force created by the spring 119 acting upon the coil 116 so that the coil will tend to move back to a balance position. Movement of the motor 111 will result in the repositioning of the indicator needle 85 upon the dial 84.

If the current change in the input leads 15 and 16 should be in the opposite direction, the blade 101 will be displaced downwardly and a reversed phasing will be produced in the output on leads 120 and 121. This reversed phasing will result in the device 103 conducting more than the device 102 and the phasing of the motor drive signal will be reversed 180° so as to cause reverse operation of the motor. As before, the repositioning of the motor will cause the indicator needle 85 to assume a new position and the gear 118 acting through spring 119 to produce a new force to balance the change in the input force created by the current from the leads 15 and 16.

Figure 6:
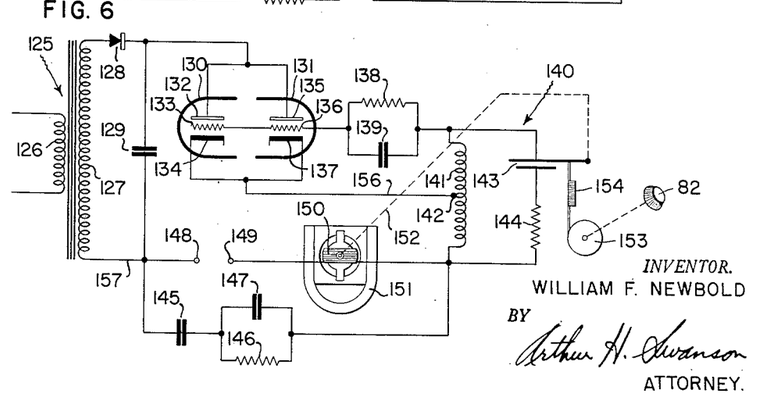
Fig. 6 is a showing of a circuit for producing an output electrical current for determining the set point of the apparatus.

Figure 6

The electrical circuit of Fig. 6 is a representative circuit for obtaining a set point current for the overall control apparatus. This circuit is likewise of the force balance type in that an input force is balanced by a force proportional to the output of the apparatus.

More specifically, the circuit of Fig. 6 comprises an input transformer 125 having a primary winding 126 and a secondary winding 127. Connected in series with the secondary 127 is a conventional rectifier 128 while a by-pass condenser and filter condenser 129 are connected across the secondary 127 of the output of the rectifier 128. A pair of triode devices 130 and 131 are also connected to the secondary 127. The device 130 comprises an anode 132, a control electrode 133, and a cathode 134, while the device 131 comprises an anode 135, a control electrode 136, and a cathode 137. Connected to the input control electrodes are a parallel connected resistor 138 and condenser 139. Also in the input to the devices 130 and 131 is a resonant tank circuit 140 which includes a tapped inductor 141 having a tap 142, an adjustable condenser 143 and a resistor 144.

A condenser 145 is connected in series with a resistor 146 having a condenser 147 in parallel therewith. The current output for the apparatus is on leads 148 and 149 and in series with this current output is a coil 150 which is arranged to cooperate with a permanent magnet 151. A mechanical connection 152 is provided to the condenser 143. The input force to the condenser 143 is supplied by way of the set point adjustment knob 82 acting through gearing 153 and spring 154 to apply a variable biasing force to the movable plate of the condenser 143. The knob 82 is also directly connected to the dart 86 which cooperates with the indicator dial 84, shown in Fig. 4.

The operation of the circuit of Fig. 6 is based upon the principle that the current flow in an oscillator circuit will be dependent in part upon the tuning of the resonant circuit of the oscillator. The oscillator in the present arrangement includes the devices 130 and 131 acting in parallel with the output and input of the devices 130 and 131 being coupled to the resonant tank circuit 140. The rectifier 128 and condenser 129 will establish, with the other circuitry, a D. C. potential for the tubes 130 and 131. A current flow circuit may be traced through the rectifier 128, the parallel connected devices 130 and 131, conductor 156, the lower portion of the coil 141 from tap 142, coil 150, output terminals 149 and 148, and conductor 157 back to the lower terminal of the secondary 127. The current through the lower section of the coil 141 will induce a signal in the upper section and this signal will be applied to the control electrode 136 in a regenerative manner so as to set up oscillations in the circuit. The frequency of oscillations will be determined in part by the tuning of the resonant tank circuit as adjusted by the positioning of the movable condenser plate of the condenser 143. For a particular input force to the movable plate of the condenser 143 by the spring 54, the oscillator section will produce an output current which, when flowing through the coil 150, will produce a counterbalancing force attempting to maintain the movable blade in a fixed position. The current necessary to accomplish this balance is the set point current of the system. The changing of the set point current is accomplished by adjustment of the knob 82 which in turn will change the force of the spring 54 acting upon the movable blade of the condenser 143.

The particular circuit at hand is desirable when the circuit constants thereof are selected so that the resonant tank circuit 140 has a relatively low Q. When so selected, it is possible to attain substantially linear changes in output current for linear changes in the setting of the input knob 82 so that ready calibration between the dart 86 and the output current from the circuit may be accomplished.

Figure 7:
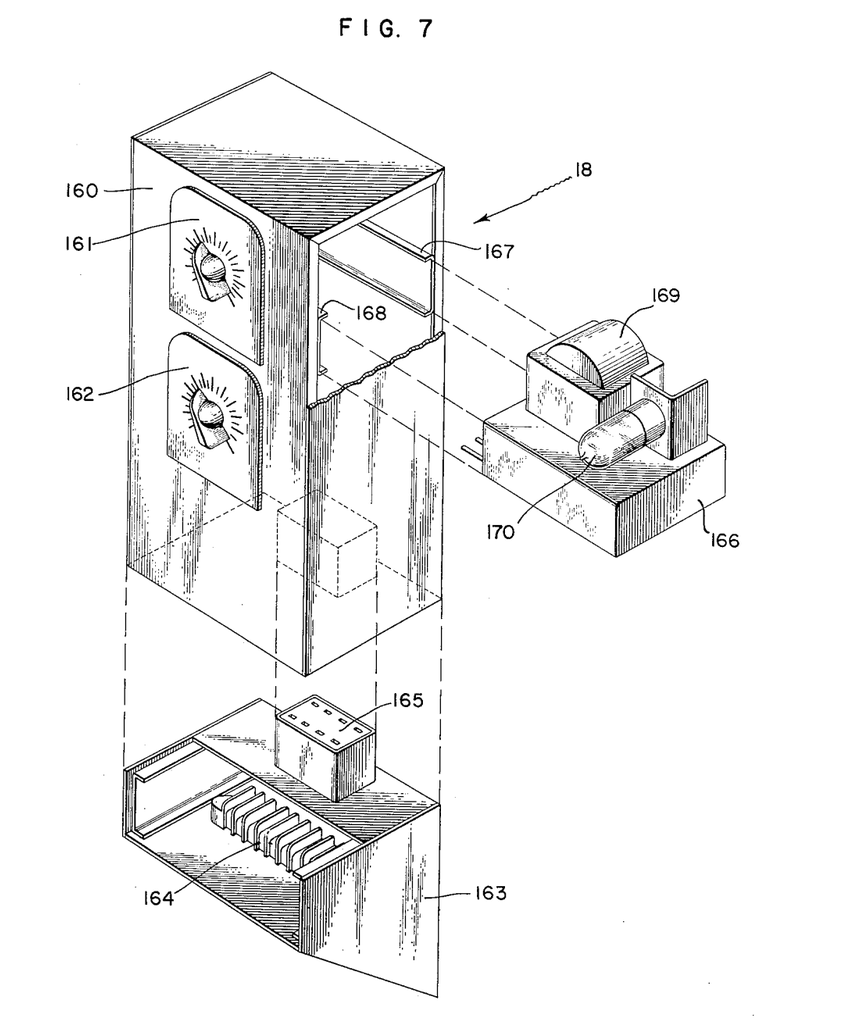
Fig. 7 shows a preferred form of mounting rack and panel for the controller portion of the apparatus.

Figure 7

The controller 18 shown in Fig. 7 in its mechanical details will be seen to comprise a basic panel structure 160. This panel structure has on the front thereof a pair of calibrating dials 161 and 162. The dial 161 may be the means for manually selecting the proportional band of the apparatus while the calibrated dial 162 may be used for selecting the reset rate of the apparatus. The panel structure 160 is adapted to be removably mounted on a base 163. The base 163 carries an electrical terminal box 164 and a female socket 165.

Mounted within the panel 160 are a plurality of electrical sections, such as the section 166 which is adapted to be removably mounted in the panel by the guiding channels 167 and 168. These electrical components may be interchanged or removed from the apparatus in a manner to be hereinafter explained without interruption of the electrical circuit. As shown, the electrical component 166 may include a transformer 169, a vacuum tube 170, and other electrical circuitry within the base of the unit, the latter circuitry not being illustrated.

Figures 8, 9, 10:
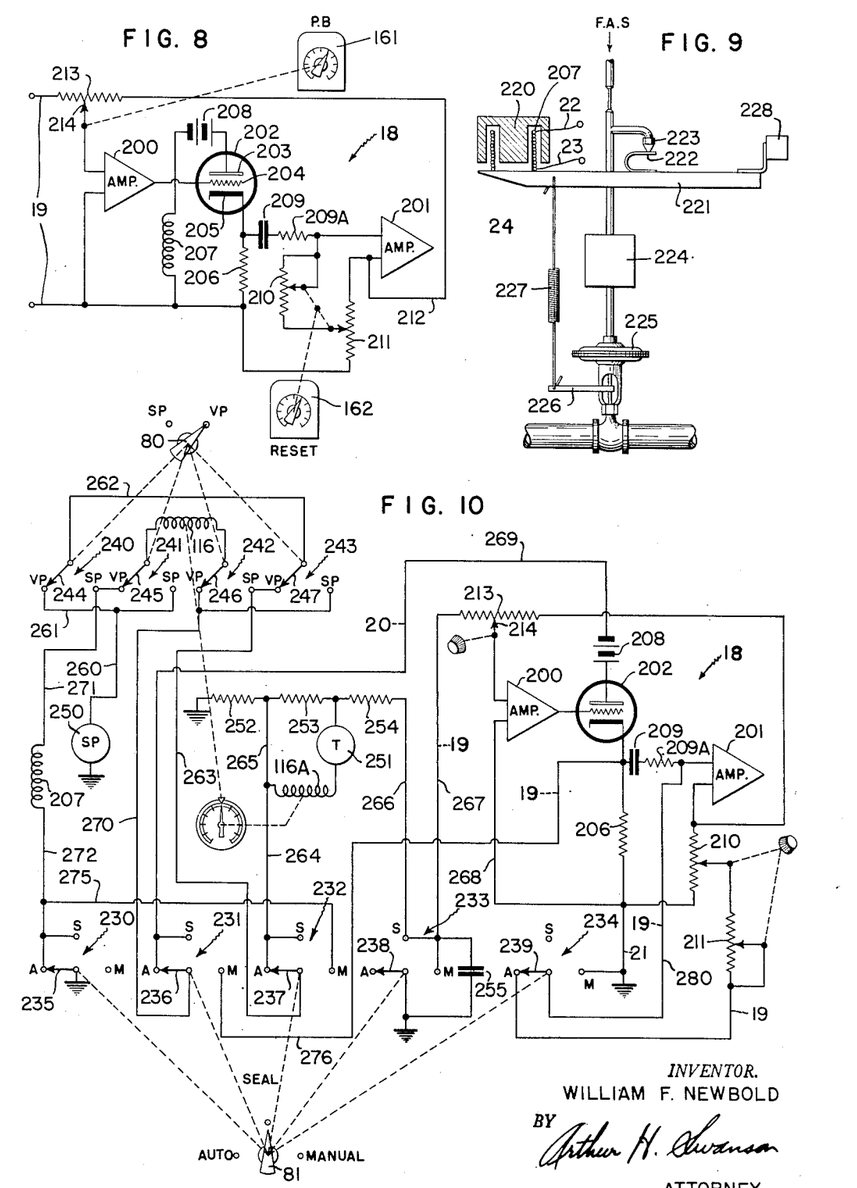
Fig. 8 shows a preferred form of the electrical circuit of the controller of the apparatus.
Fig. 9 is a representation of an electric to pneumatic valve positioner for the control apparatus.
Fig. 10 shows the electrical circuit for switching the control apparatus.

Electrical circuitry for this controller is shown in Fig. 8 and further amplification of the circuitry may be found in my copending application entitled Electrical Control Apparatus, Serial No. 366,037, filed July 31, 1953.

Figure 8

The electrical circuit of Fig. 8 shows a preferred form of the controller of the present apparatus. The details of this electrical controller will be found in my above mentioned copending application.

The controller circuit includes a pair of balanced amplifiers 200 and 201. The amplifier 200 has its output connected to an output control device 202 having an anode 203, a control electrode 204, and a cathode 205. The output of the device 202 includes a resistor 206 and a galvanometer coil 207 which may be a part of the valve positioner 24. A battery 208 is shown supplying energy to the device 202. The input to the amplifier section 201 includes a reset condenser 209 in series with a resistor 209A and a pair of adjustable resistors 210 and 211, said resistors 210 and 211 providing an adjustment for the reset rate of the controller. A feedback connection from the amplifier section 201 is provided by lead 212 which leads to an adjustable proportional band slidewire 213 having a tap at 214.

The operation of Fig. 8 may best be considered by first assuming that there is no input signal applied to the input on leads 19. It is further assumed that there is no voltage or charge accumulated on the reset condenser 209. Under these circumstances, the output current of the device 202 will be a fixed value which will remain fixed so long as the input to the controller remains zero. If a step input should be applied to the terminal input leads 19, this input will be amplified by the amplifier 200 and applied to the control device 202 which will produce an output control current which will vary proportionally with the magnitude of the step input. Connected across the resistor 206 is the condenser 209 and the reset resistors 210 and 211 which provide the input for the amplifier device 201. With a step input, the condenser 209 will effectively pass the leading edge of the step and a feedback signal will be immediately applied by way of the lead 212 back to the proportional band slidewire resistor 213 which will effectively apply a balancing signal to the input step signal. If the step signal remains, the condenser 209 will be slowly charged and in order for a balanced condition to be maintained on the input of the amplifier 200, it is necessary that the output thereof be continuously changing. Thus, the reset network will gradually effect an increase in the output current of the device 202. This gradual increase will continue so long as this input signal remains. If the input signal should go to zero, the condenser 209 will tend to maintain the current flow last established in the device 202 so as to hold the output current from the device 202 at a fixed value. If it is desired to increase the reset rate of the apparatus, it is but necessary to decrease the amount of resistance in the circuit with the condenser 209. As is pointed out in the above mentioned copending application, the gain of the amplifier 201 is one of the factors in determining the overall time constant for the condenser 209.

The proportional band resistor 213 and its associated slider 214 are effective to determine the amount of output current change from the device 202 which may be expected for a particular unitary input signal on the input leads 19.

*Figure 9*

Fig. 9 shows an electro-pneumatic valve positioner in schematic form. The preferred form of this valve positioner will be found in a copending application of William J. Popowski, entitled "Control Apparatus," filed on July 2, 1953, and bearing Serial No. 365,757. The input to the valve positioner is an electric current which is applied to the input coil 207. This coil cooperates with the permanent magnet 220 in creating a variable force upon a beam 221, said force varying by an amount proportional to the current flowing in the coil 207. The motion of the beam 221 is effective to displace a flapper 222 with respect to a nozzle 223 to change the back pressure of the nozzle. The nozzle back pressure is in turn applied to a suitable pneumatic relay 224 with the output pressure of the pneumatic relay being applied to the valve 25. The output of the valve is detected by means of a beam 226 which is attached to the output element of the valve and the output motion is used to force balance the beam 221 by means of the spring 227 which is connected between the arm 226 and the beam 221. The beam 221 carries a weight 228 at the end opposite the coil 207 so as to maintain the beam balanced.

In operation, the apparatus of Fig. 9 is arranged so that with a particular input current to the coil 207 there will be produced a force upon the beam 221 which force will move the flapper 222 with respect to the nozzle 223 and create a proportional output pressure. The output pressure from the nozzle 222, as passed through the relay 224, will control the positioning of the valve 25. The valve 25 will in turn produce an output feedback action by way of the arm 226 and spring 227 to force balance the beam 221 back toward its originally assumed position.

*Figure 10*

The circuit shown in Fig. 10 is the electrical switching circuit for the overall control apparatus. This includes the principal switch 81 which has three positions, automatic, seal, and manual. Also included is the indicator switch 80 which is arranged to switch the indicator to read either set point or valve position. The principal switch 81 includes five stacks of three position switches. The stacks are identified by the numerals 230, 231, 232, 233, and 234. Each stack includes three positions identified by the letters A, for automatic, S, for seal, and M, for manual. In addition, each of the switches 230 through 234 includes an adjustable switching arm 235 through 239 respectively.

The switch for the indicator which is attached to the knob 80 includes four stacked two position switches. The four stacks are identified by the numerals 240, 241, 242, and 243. The two switching positions on each of the stacks are identified VP, for valve position, and SP, for set point position. Each of the stacks includes a movable switch blade identified by the numerals 244 through 247 respectively.

The numeral 250 represents the set point source, shown in Fig. 6, while the numeral 251 represents the transmitter source. The set point current source 250 is effective to produce a voltage across a resistor 252 while the transmitting source is effective to produce a voltage drop across a further resistor 253. A resistor 254 and a condenser 255 serve to cut down and filter transient noises present in the direct current circuits.

With the apparatus in the position shown in Fig. 10, the switch 81 is in the automatic position and the switch 80 is in the valve position indication position. When so switched, the set point source 250 will be producing a voltage across the resistor 252 by a circuit that may be traced from the upper terminal of the set point source 250 to lead 260, lead 261, switch blade 244, lead 262, switch blade 247 in position VP, lead 263, blade 237, contact A, switch 232, lead 264, lead 265, and resistor 252 to ground back to the lower terminal of the set point source 250. The transmitter source 251 is applying a voltage to the resistor 253 in a circuit that may be traced from the upper terminal of the source 251 through resistor 253, lead 265, indicator coil 116A, back to the lower terminal of the source 251. The electrical signals on the resistors 252 and 253 are in electrical opposition so that the difference is applied by way of resistor 254, lead 266, and lead 267 to the input of the controller at the proportional band resistor 213. The other input to the controller is by lead 268 which is connected to ground.

The electrical circuit for the output of the control device 202 may be traced from the upper terminal of device 202 through the battery 208, lead 269, contact A of switch 231, blade 236, lead 270, contact VP of switch 242, blade 246, indicator coil 116, blade 245, contact VP of switch 241, and lead 271 to the valve positioner coil 207 and from there to lead 272, contact A of switch 230, blade 235 and ground, back to the ground of the device 202, through resistor 206 to the device 202.

While the apparatus is switched in the automatic position, the reset condenser 209 will function in the normal manner to provide a continual change in the output current of the device 202 when there is a continued error signal on the input to the controller at the proportional band resistor 213 and lead 268.

Figure 11:
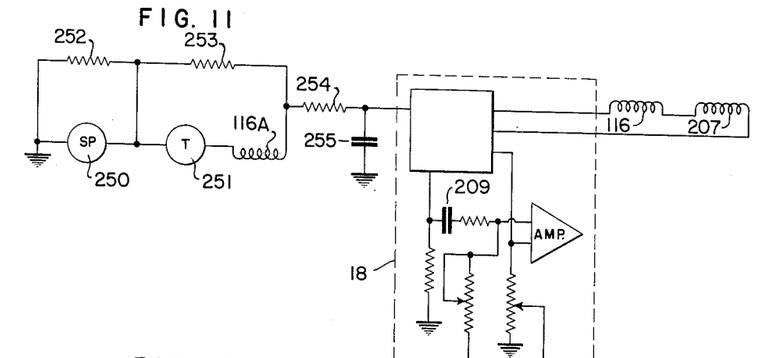
Fig. 11 is a diagrammatic showing of the electrical circuit of the apparatus when in the automatic position.

The foregoing circuit may be much more readily considered in Fig. 11 where the electrical switches have been eliminated. Here it will readily be seen that the set point source 250 is connected to produce a voltage across the resistor 252 and the transmitting source 251 is connected to produce a voltage across the resistor 253. The difference between these two signals is applied through the resistor 254 to the input of the controller 18. The output of the controller 18 passes through the indicator coil 116, which is connected to read the valve position, and the valve positioner coil 207.

Referring back to Fig. 10, when the apparatus is switched to the seal position, it is desired that the controller maintain an output current in device 202 which is of a magnitude corresponding to the magnitude immediately prior to the switching from the automatic position. Inasmuch as the output current from the controller will change only when there is an input signal, the input signal is eliminated by the short circuiting of the input. The short circuiting is accomplished by the switching section 233 which, when moved to a position where the blade 238 engages the contact S, effects a short circuiting or grounding of the lead 267 which goes to the input of the controller. Further, to prevent the changing of the charge accumulated on the condenser 209, the resistance circuit associated therewith is disconnected therefrom. This is accomplished by the switching stack 234 when the switch blade 239 moves into engagement with the open contact S, which contact is normally open circuited insofar as the electrical circuit is concerned.

The resistor 209A in series with the condenser 209 prevents the charge on the condenser from being changed during the switching operation, the latter being important in apparatus where all the switches do not operate simultaneously.

Figure 12:
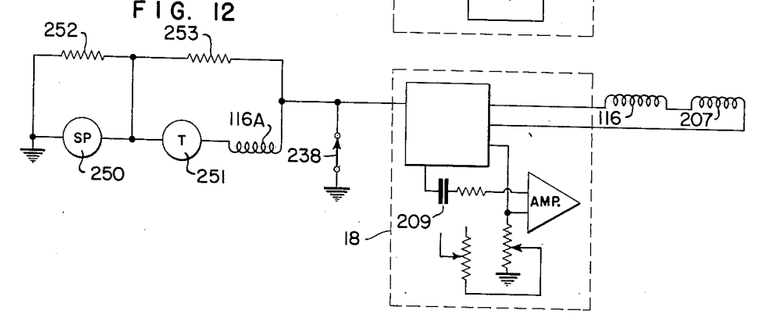
Fig. 12 is a diagrammatic showing of the electrical circuit of the apparatus when in the seal position.

Referring to Fig. 12, the circuit has been redrawn in simplified form in the seal position. Here, the input to the controller 18 is shown as being short circuited and the electrical resistance network around the condenser 209 has been eliminated. Thus, the controller 18 should be effective to produce an output control current which remains substantially constant with the current magnitude depending upon the charge upon the condenser 209 immediately prior to its disconnection from the automatic position.

Referring again to Fig. 10, when the apparatus is switched to the manual position it is desired that the set point source be effectively directly connected to supply current to the valve positioner coil 207 and that the reset condenser 209 be charged to a value proportional to that current flow. Further, the input to the controller 18 is maintained in its short circuited position.

The connection of the set point source 250 to the valve coil 207 may be traced from the upper terminal of the source 250 through lead 260, lead 261, switch blade 244, lead 262, switch blade 247, contact VP of switch 243, lead 263, switch blade 237, contact M, lead 275, lead 272, coil 207, lead 271, contact VP of switch 241, switch blade 245, coil 116, switch blade 246, contact VP of switch 242, lead 270, blade 236, contact M of switch 231, lead 276, resistor 206, and ground back to the ground at the lower side of the set point source 250. Further, the short circuiting of the input to the controller is accomplished by the switch stack 233 with the switch blade 238 engaging contact M in connecting the input lead to the controller at 267 to ground.

In order to keep the controller in step with the current flowing through the valve 207, it will be noted in the above traced circuit that the valve current is flowing through the resistor 206 in the output of the control device 202. In order to keep the reset in step with this current flow, the condenser 209 is directly connected across the resistor 206 and this connection is effected by the switch 234 with the switch 239 engaging contact M to connect lead 280 to ground so that the condenser 209 is effectively in parallel with the resistor 206.

Figure 13:
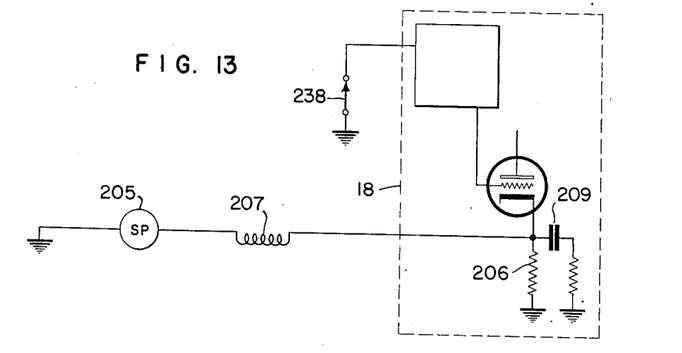
Fig. 13 is a diagrammatic showing of the electrical circuit when the control apparatus is in the manual position.

Fig. 13 shows the apparatus when in the manual position without the electrical switching circuits included. It will be seen that the set point source 205 is connected directly in series with the valve positioner coil 207 and the output resistor 206 with the reset condenser 209 connected in parallel with the output resistor 206.

While the condenser 209 is connected in parallel with the output resistor 206, it is accumulating a charge which charge will be effective upon the controller being switched to the seal or automatic positions to produce an output control current from the device 202 which will be the same as the current flow which established the charge on the condenser 209. Thus, it is possible to achieve bumpless switching with the output controller current remaining substantially fixed during the switching operation.

The apparatus, when switched from manual back to automatic should be aligned so that the set point current output corresponds to the variable. To do this, with the apparatus switched to manual, the manual operator will generally adjust the set point source 250 until the variable as indicated by the indicator needle 85 is at the desired value. The apparatus is then switched to the seal position, the switch 89 is switched to the set point position SP and the set point source is then adjusted until the dart 86 is aligned with the needle 85, at this position, the set point current and variable current from the transmitter 251 will be equal and the control may be switched to the automatic position without a bump in the output.

It will be readily apparent that there are many ways in which the electrical switching may be accomplished in order to carry out the principal features of the present invention. One factor should be noted in all switching circuits wherein an electrical circuit is momentarily opened and that is that the switching should be accomplished in a short time. Snap acting switches or relay controlled contacts may be used for this purpose. Further, there are numerous types of current producing sources which may be used to produce the controlling signals for the apparatus of the present type.

While, in accordance with the provisions of the statutes, there has been illustrated and described the best forms of the invention known, it will be apparent to those skilled in the art that changes may be made in the forms of the apparatus disclosed without departing from the spirit of the invention as set forth in the appended claims and that in some cases certain features of the invention may be used to advantage without a corresponding use of other features.

Having now described my invention, what I claim as new and desire to secure by Letters Patent is:

1. In an electrical controller for controlling the magnitude of a variable, an output control amplifying device, a resistor connected in the output of said amplifying device, a reset condenser normally connected to the output of said amplifying device in a feedback circuit in said controller, a current utilization circuit normally connected to said amplifying device to be controlled by the output of said device, an electrical signal source, switching means when actuated for disconnecting said utilization circuit from said amplifying device and connecting said utilization circuit directly to said signal source through a circuit including said resistor, and means connecting said reset condenser in parallel with said resistor when said switching means is actuated to maintain said condenser in step with the signal to said utilization circuit.

2. In a controller having manual and automatic operating positions, the combination comprising, an output control device having a resistor connected in series therewith, a controller feedback circuit including a reset condenser connected at one end to said resistor, an adjustable signal source, a controller input circuit connected to said control device, a current utilization circuit, and switching means having an automatic position and a manual position, said switching means when in said automatic position connecting said adjustable signal source to said controller input circuit and said utilization circuit in a series circuit with said resistor, said switching means when in said manual position connecting said adjustable signal source directly to said utilization circuit and said condenser in parallel with said resistor.

3. In a controller having manual and automatic operating positions, the combination comprising, an output control device having a resistor in series therewith, a controller feedback circuit including a reset condenser connected at one end to said resistor, an adjustable signal source, a controller input circuit connected to said control device, a current utilization circuit, and switching means having an automatic position and a manual position, said switching means when in said automatic position connecting said adjustable signal source to said controller input and said utilization circuit in a series circuit with said resistor, said switchng means when in said manual position connecting said adjustable signal source directly to said utilization circuit, said condenser in parallel with said resistor, and short circuiting said controller input.

4. Apparatus as defined in claim 3 wherein said reset condenser has a second resistor connected in series therewith to maintain the charge thereon during the interval when said switching means is being actuated.

5. In a controller having manual and automatic operating positions, the combination comprising, an output control device having a resistor in series therewith, a controller feedback circuit including a reset condenser connected at one end to said resistor, an adjustable signal source, a signal source which varies in accordance with the magnitude of a variable, a controller input circuit connected to said control device, a current utilization circuit, and switching means having an automatic position and a manual position, said switching means when in said automatic position connecting said adjustable signal source and said variable signal in signal comparing relation to said controller input and said utilization circuit in a series circuit with said resistor, said switching means when in said manual position connecting said adjustable signal source directly to said utilization circuit and said condenser in parallel with said resistor.

6. Electrical control apparatus comprising, an electrical controller having an input and an output, a resistor included in said output, a feedback connection from said output to said input and including a controller reset impedance, a manually adjustable signal source, a variable signal source, a signal utilization circuit, switching means having a manual and an automatic position, means including said switching means when in said automatic position connecting said adjustable and variable signal source in voltage comparison relation to said input and said utilization circuit to said output, and means including said switching means when in said manual position connecting said adjustable signal source directly to said utilization circuit through said resistor and connecting said impedance to said resistor to keep the signal across said impedance in step with the operation of said adjustable source.

7. Electrical control apparatus comprising, an electrical controller having an input and an output, a resistor included in said output, a feedback connection from said output to said input and including a controller reset impedance, a resistance circuit for producing with said reset impedance a time delay, a manually adjustable signal source, a variable signal source, a signal utilization circuit, switching means having a manual, seal and automatic position, means including said switching means when in said automatic position connecting said adjustable and variable signal sources in voltage comparison relation to said input, connecting said utilization circuit to said output, and connecting said resistance circuit to said reset impedance, means including said switching means when in said seal position short circuiting said input and disconnecting said resistance circuit from said reset impedance so that said impedance will retain its electrical reset accumulation, and means including said switching means when in said manual position connecting said adjustable signal source directly to said utilization circuit through said resistor, short circuiting said input, and connecting said resistor to said impedance so that said impedance will maintain an electrical reset accumulation to follow the signal applied to said utilization circuit.

8. Electrical control apparatus comprising, an electrical controller having an input and an output, a resistor included in said output, a feedback connection from said output to said input and including a controller reset impedance, a resistance circuit for producing with said reset impedance a time delay, a manually adjustable signal source, a variable signal source, a signal utilization circuit, switching means having a manual, seal, and automatic position, means including said switching means when in said automatic position connecting said adjustable and variable signal sources in series opposition to said input, connecting said utilization circuit to said output, and connecting said resistance circuit to said reset impedance, means including said switching means when in said seal position short circuiting said input and disconnecting said resistance circuit from said reset impedance so that said impedance will retain its electrical reset accumulation, and means including said switching means when in said manual position connecting said adjustable signal source directly to said utilization circuit through said resistor, short circuiting said input, and connecting said resistor to said impedance so that said impedance will maintain an electrical reset accumulation to follow the signal applied to said utilization circuit.

9. Electrical control apparatus comprising, a transmitter producing an electrical signal which varies in accordance with the magnitude of a variable, a set point electrical signal source for producing an electrical signal in accordance with a manual adjustment, a first resistor in series with said transmitter, a second resistor in series with said set point source, an electrical controller having a reset condenser connected in a feedback circuit between the controller input and output, a third resistor in series with said controller output, switching means having a manual and automatic position, an output utilization circuit, means including said switching means when in the automatic position connecting said first and second resistors in series to the input of said controller and said utilization circuit to the output of said controller, and means including said switching means when in the manual position connecting said set point source directly to said utilization circuit through said third resistor and connecting said reset condenser to said third resistor so that said condenser will follow the voltage conditions on said third resistor.

10. Electrical control apparatus comprising, a transmitter producing a direct current electrical signal which varies in accordance with the magnitude of a variable, a set point direct current electrical signal source for producing an electrical signal in accordance with a manual adjustment, a first resistor in series with said transmitter, a second resistor in series with said set point source, an electrical controller having a reset condenser connected in a feedback circuit between the controller input and output, a third resistor in series with said controller output, switching means having a manual and automatic position, an output utilization circuit, means including said switching means when in the automatic position connecting sad first and second resistors in series to the input of said controller and said utilization circuit to the output of said controller, and means including said switching means when in the manual position connecting said set point source directly to said utilization circuit through said third resistor and connecting said reset condenser to said third resistor so that said condenser will follow the voltage conditions on said third resistor.

11. Electrical control apparatus comprising, a transmitter producing an electrical signal which varies in accordance with the magnitude of a variable, a set point electrical signal source for producing an electrical signal in accordance with a manual adjustment, a first resistor in series with said transmitter, a second resistor in series with said set point source, an electrical controller having a reset condenser connected in a feedback circuit between the controller input and output, a third resistor in series with said controller output, switching means having a manual, seal, and automatic position, an output utilization circuit, means including said switching means when in the automatic position connecting said first and second resistors in series to the input of said controller and said utilization circuit to the output of said controller, means including said switching means in the seal position rendering the input to said controller ineffective and connecting said reset condenser so that it will hold the output of said controller to said utilization circuit at a constant value, and means including said switching means when in the manual position connecting said set point source directly to said utilization circuit through said third resistor and connecting said reset condenser to said third resistor so that said condenser will follow the voltage conditions on said third resistor to maintain the reset in step during manual operation.

12. In an electrical controller, the combination comprising, a signal amplifier having an input and an output, a reset circuit including a feedback circuit from said output to said input including a reactance and a resistor, said resistor acting with said reactance to determine the time constant of said reset circuit, switching means connected to said reset circuit for disconnecting said resistor from said reactance so that said reactance will retain an electrical accumulation which will maintain the output of said amplifier substantially constant.

13. In an electrical signal controller, the combination comprising, an electrical amplifier having an input and an output, a reset circuit connected to said amplifier to cause the output of said amplifier to continuously change with a constant input signal, said reset circuit including an interconnected condenser and a resistor circuit which cooperates with said condenser to determine the rate at which the output of said amplifier changes, and switching means connected to said resistor circuit to disconnect said resistor circuit from said condenser so that said condenser will maintain the output of said amplifier constant at an amplitude corresponding to the amplitude immediately prior to the actuation of said switching means.

14. Apparatus as defined in claim 13, wherein said switching means when actuated short circuits the input of said electrical amplifier.

15. Apparatus as defined in claim 13 wherein a further resistor is connected in series with said condenser to maintain the charge on said condenser when said switching means is being actuated.

References Cited in the file of this patent

UNITED STATES PATENTS

| | | |
|---|---|---|
| 2,644,642 | Smoot | July 7, 1953 |
| 2,666,170 | Davis | Jan. 12, 1954 |
| 2,679,022 | McIlhenny | May 18, 1954 |